(12) United States Patent  
Chamberlain et al.

(10) Patent No.: US 7,333,391 B2
(45) Date of Patent: Feb. 19, 2008

(54) UNIVERSAL SEISMIC CABLE CONNECTOR

(75) Inventors: Donald G. Chamberlain, Cochrane (CA); Randall Vincent Cameron, Irricana (CA)

(73) Assignee: ARAM Systems, Ltd, Calgary, Alberta (CA)

( * ) Notice: Subject to any disclaimer, the term of this patent is extended or adjusted under 35 U.S.C. 154(b) by 152 days.

(21) Appl. No.: 11/283,423

(22) Filed: Nov. 18, 2005

(65) Prior Publication Data
US 2006/0133201 A1   Jun. 22, 2006

Related U.S. Application Data

(60) Provisional application No. 60/635,216, filed on Dec. 11, 2004.

(51) Int. Cl.
*G01V 1/38* (2006.01)
*H01R 13/58* (2006.01)

(52) U.S. Cl. .................. 367/20; 439/606; 439/281
(58) Field of Classification Search .............. 367/20; 439/606, 281
See application file for complete search history.

(56) References Cited

U.S. PATENT DOCUMENTS

| | | | |
|---|---|---|---|
| 3,271,726 A * | 9/1966 | Pfendler | 439/76.1 |
| 3,725,845 A * | 4/1973 | Moulin | 439/291 |
| 3,954,319 A | 5/1976 | Haines | |
| 4,114,970 A | 9/1978 | Hall, Jr. | |
| 4,166,663 A | 9/1979 | Walker et al. | |
| 4,260,211 A | 4/1981 | Mollere | |
| 4,445,741 A | 5/1984 | Annoot | |
| 4,609,247 A | 9/1986 | Annoot | |
| 4,696,539 A | 9/1987 | Knowles | |
| 5,120,268 A | 6/1992 | Gerrans | |
| 5,152,944 A | 10/1992 | Khalil | |
| 5,387,119 A | 2/1995 | Wood | |
| 5,417,592 A | 5/1995 | West | |
| 5,624,288 A | 4/1997 | Becker | |
| 5,641,307 A | 6/1997 | Gerrans | |
| 5,885,108 A | 3/1999 | Gerrans, Jr. | |
| 5,984,714 A | 11/1999 | McNeel | |
| 5,984,724 A | 11/1999 | Gerrans | |
| 6,102,751 A | 8/2000 | Becker | |
| 6,447,319 B1 | 9/2002 | Bodin | |
| 6,475,032 B1 | 11/2002 | Dvorak | |
| 6,997,731 B1 * | 2/2006 | Wood et al. | 439/314 |

* cited by examiner

*Primary Examiner*—Mark Hellner
(74) *Attorney, Agent, or Firm*—W. Allen Marcontell

(57) ABSTRACT

A hermaphroditic connector for a multiple conduit cable assembly comprises a cylindrical protective collar surrounding an inner cylindrical core. The collar is axially secured to the inner core but partially rotatable about the core. The distal end of the collar is formed to rotatively mesh with another collar of the same shape to mechanically secure a joint of two collars. Cable conduits enter the assembly through one axial end for electrical junction to terminals imbedded within the inner core. The terminals are functionally aligned with one of four parallel chord sections on the distal end-face of the inner core. The cross-sectional area of the inner core end-face is divided into two half-area sections; two parallel chord sections in each half-area section. The distal end-faces of the several chord sections are profiled to three, axially spaced, cross-sectional planes to axially mesh respective connector pins and sockets.

20 Claims, 13 Drawing Sheets

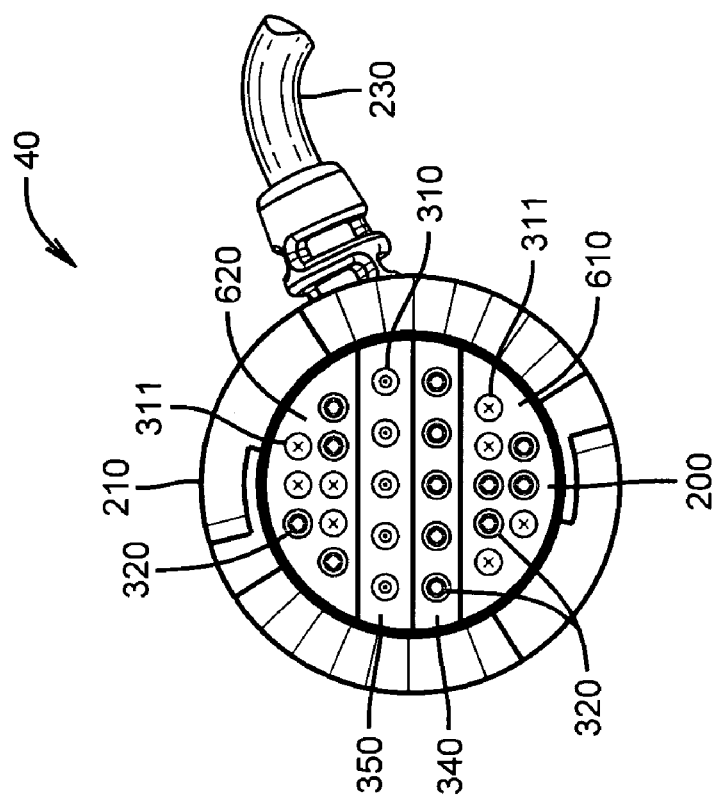
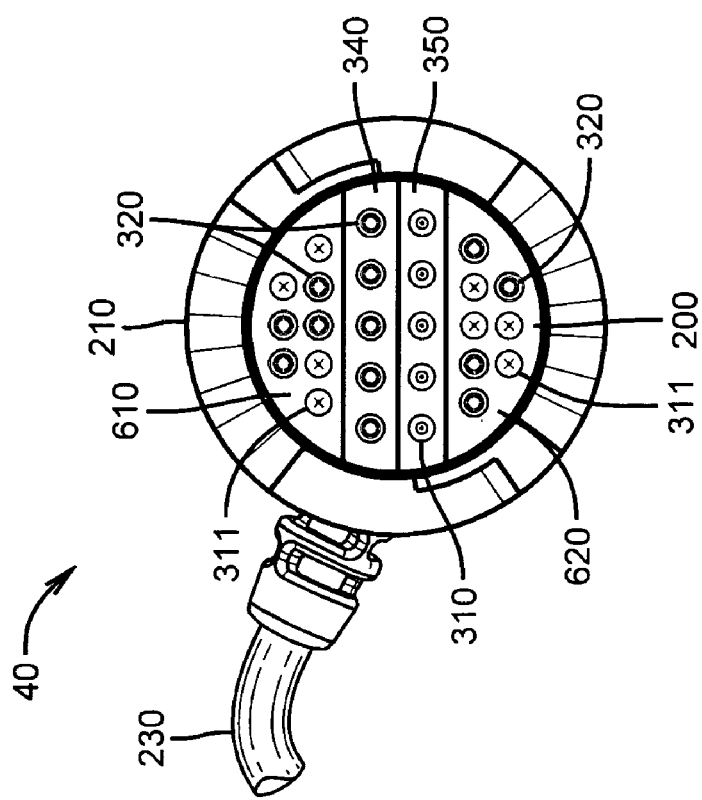
FIG. 3b
FIG. 3a

UNIVERSAL SEISMIC CABLE CONNECTOR

CROSS-REFERENCE TO RELATED APPLICATIONS

This application claims the Dec. 11, 2004 filing date benefit of Provisional Patent Application No. 60/635,216.

STATEMENT REGARDING FEDERALLY SPONSORED RESEARCH OR DEVELOPMENT

Not Applicable.

BACKGROUND OF THE INVENTION

1. Field of the Invention

The present invention relates to novel seismic survey data acquisition equipment design; and also to seismic survey methods utilizing the uniquely designed and manufactured equipment. In particular, the invention relates to seismic survey cable connector design, equipment assembly combinations, the methods of equipment deployment, and operation of equipment.

2. Description of Related Art

In principle, a seismic survey represents a voluminous data set containing detailed information that may be analyzed to describe the earth's layered geology as indicated by seismic wave reflections from acoustic impedance discontinuities at the layer interfaces. The analysis is influenced by elastic wave propagation velocities respective to the differences in strata density or elasticity. A seismic event such as is caused by the ignition of buried explosives in a shallow borehole or by a vibratory mechanism placed at the earth's surface is launched into the earth at a precisely known location and time. Seismic waves propagating away from this original man-made seismic event are detected by a multiplicity of analog or digital sensors characterized in the art as geophones and/or hydrophones. Arrays of such sensors are distributed in a more or less orderly grid over the area of interest. The location of each sensor array is precisely mapped relative to the location of the seismic event. As the seismic wave from the timed event travels out from the source, reflections and other emanations from that original seismic wave are returned to the surface where they are detected by the sensors. The sensors respond to the receipt of a wave with a corresponding analog or digital electrical signal. There may be an array of individual sensor units that are combined in a physical circuit to provide a one timevariant signal to a data acquisition module on a sensor signal channel. One or more channels are received by a digital-signal-processing/communication module, called remote acquisition module (RAM) in this document. The RAM digitizes the analog signal streams for retransmission toward a central recording unit (CRU). If digital sensors instead of analog sensors are utilized, the RAM is not required to digitize the signals but must still perform other duties including retransmission of the signals toward the CRU. Among the significant data transmitted by a RAM or digital sensor may be the amplitude or strength of the reflected wave. The exact time lapse between the moment the event occurred and the moment the analog value of the sensor or sensor array is translated to a digital value may be digitized or it may be determined implicitly by position of the sample within a data stream.

In a single survey, there may be many thousands of sensor signal sources. Consequently, the data flow must be orderly and organized. Managing an orderly flow of this massive quantity of data the CRU, often in a field survey truck, requires a plurality of RAMs and other digital signal processing devices. The RAMs and other digital signal processing devices may be connected by cables for the purpose of data transmission toward the CRU and communication of control signals and other information in both directions, toward and away from the CRU. The system controller within the CRU may define and operate a communication network that includes all of the devices variously connected. In one example of such a system, RAMs may be connected by cable sections to form a receiver-line. Multiple receiver-lines may typically be connected to a base-line via digital-signal-processing/communication devices that may be called base-line units (BLUs). The base-line may consist of multiple cable sections connected by a series of BLUs and ultimately to the central recording unit (CRU) that includes the system controller. A RAM may receive the analog or digital sensor data from a multiplicity of sensors or sensor arrays and, in the case of analog sensors, converts the analog data to digital data. The RAM may then transmit the digital data, in the form of data packets, along its receiver-line. Transmissions may be to the adjacent RAM which relays the received information to the next proximate RAM, which in turn relays the data onward. At the point where the receiver-line connects to a base-line, the connecting BLU receives the transmission of all of the data from the series of RAMs in that receiver-line as transmitted to it from the nearest RAM; transmissions along the base-line proceed from BLU to BLU and finally to the CRU.

Commands and information from the CRU travel the reverse path to the point where they are received by the intended BLU or CRU. There may be many RAMs transmitting respective data packets along a single receiver-line. Typically, two or more receiver-lines connect with a BLU that further coordinates the data packet flow along the base-line. Numerous additional BLUs, connecting sections of the base-line and joining receiver-lines to the base-line, receive and retransmit data for ultimate receipt by the CRU.

Seismic surveying is often carried out under extremely inhospitable conditions of heat or cold, tropics or arctic, land or sea, desert or swamp. Necessarily, manual placement of the sensors, data acquisition units, base-line units, receiver-line cables and base-line cables is normally required.

One of the many challenges facing seismic ground crews using cable-connected systems is the initial decision of cable configuration(s). Data demands by geologists and investors are not always predictable. Seismic contractors must try to choose cable configurations that minimize weight and complexity for their workers in the field while keeping the number and type of cables and cable connectors to a minimum.

Prior art seismic systems have been designed to use two receiver-line cable sections between each pair of RAMs with takeout connectors for each sensor array. The cables may have, for example, four (4) takeout connectors per cable section, allowing attachment of four sensor arrays. With two cable sections connecting to each RAM a total of eight (8) channels of sensor arrays is connected to the RAM (four from each side) in this example. The cable itself contains at least enough conductors to accommodate the four sensor arrays (two conductors per array) plus the communication of data and commands along the receiver-line.

The prior art approach requires that the cable connectors at the two ends of the receiver-line cable section be either (1) be of two different types; or (2) be of the same type, and if so, at the end connected to the adjoining cable, be combined with an adapter called a back-to-back connector. The undesirable features of the prior art have been necessitated by the requirement that, at the RAM end of the cable section, its sensor channels must electrically connect to the RAM, whereas at the opposite end (midway between two RAMs) there must be no electrical connection of the sensor channels. (If the sensor channels were in fact connected, two physically distinct sensor arrays would be inadvertently combined.) The prior art designs in either case (1) or (2) add to the complexity and cost of manufacturing the cables and connectors. The added complexity also seriously impacts the operational cost of system utilization. In case (1), when deploying the system in the field, the directionality of the cables sections means they must be laid onto the ground in the correct direction; and if a mistake is made the cable section must be picked up and laid a second time, in the opposite direction. In case (2) the back-to-back connector is an additional equipment item that must either be carried separately or strapped to both ends of the cable and used only for the mid-way cable-to-cable connection. This necessity hinders the efficiency and increases the cost of deployment of the field system.

Two prior art design approaches that use a hermaphroditic cable connector with an identical connector at both ends of the receiver-line cable section, and not requiring a back-to-back connector, have been proposed and tested. The first of these two designs utilizes electrical pins that are not connected to the corresponding conductors in the cable so that the geophone arrays in the two cable sections are not electrically combined. The second such design omits these electrical pins entirely. Both of these approaches have suffered from a serious shortcoming that severely affects data quality and operational cost: electrical leakage caused by water entering the connector body or the empty pin sockets. (The sockets are required when, during a subsequent deployment of the cable section, the same connector is connected to a RAM.)

An object of the present invention, therefore, is to provide a universal seismic cable connector of hermaphroditic design that can be semi-permanently affixed to both ends of receiver-line cable sections and to RAMs such that two cable sections may be joined together and connected to and between two RAMs, without regard for the direction of the cable sections and without the need of a back-to-back connector or other adapter between the two cable sections; and such that when so connected, all of the geophone channels in the two cable sections are electrically blocked at the juncture of the two cable sections, but also such that each cable section's own geophone channels are electrically connected to its RAM. In the context of this invention, "semi-permanently affixed" means that the connector may be removed and replaced only with the use of tools and materials.

Another object of the present invention is to provide a universal seismic cable connector of hermaphroditic design that can be semi-permanently affixed to both ends of a receiver-line cable section and that allows the cable section to be directly connected in either direction to another receiver-line cable section, to a base-line cable section or to a jumper cable section; or to be connected between any pair of RAMs, between any pair of BLUs, between a RAM and a BLU or between any other pair of data acquisition, processing, communication, recording, control or other modules of a seismic data acquisition system.

A further object of the invention is to provide a universal seismic cable connector of hermaphroditic design that can be semi-permanently affixed to both ends of a base-line cable section and that allows the cable section to be directly connected in either direction to another base-line cable section, to a receiver-line cable section or to a jumper cable section; or to be connected between any pair of BLUs, between a BLU and a recording unit or control unit, or between any other pair of data acquisition, processing, communication, recording, control or other units and modules of a seismic data acquisition system.

A further object of the invention is to provide a universal seismic cable connector that does not require use of a back-to-back connector or other adapter for any cable-to-cable or cable-to-module connections.

A further object is to provide such a universal seismic cable connector that is not subject to water penetration and consequent electrical leakage.

A further object of the invention is to provide a universal seismic cable connector that is robust and able to reliably and repeatedly withstand compressional, tensional, shear and vibrational forces normally encountered in field utilization, without sustaining damage, under the very wide range of field conditions encountered by seismic field crews operating around the world in all climates, terrains, and exposure to water including saline water.

A further object is to provide such a universal seismic cable connector that is manufacturable at competitive cost and is thus affordable by industry standards; and to further reduce equipment cost by reducing the number of connector and adapter types, as well as the absolute number of connectors and adapters, required to conduct seismic data acquisition projects.

A further object is to provide a universal seismic cable connector that is easy to manually connect and disconnect and that may not be physically connected in a manner that does not provide correct connection of the intended conductors.

A still further object of the invention is to allow seismic network modules that may be able to perform multiple functions to be inter-connectable with either base-line, receiver-line or jumper cable sections thereby maximizing flexibility and efficiency of equipment utilization.

BRIEF SUMMARY OF THE INVENTION

The foregoing objects of the invention and others not specifically stated above will be apparent to those of ordinary skill in the art from the following summary.

The classical definition of hermaphrodite is an animal or plant having the reproductive organs of both male and female. The same term is used herein to describe a seismic cable connector that allows a connection of seismic receiver and base-line cable sections to other cable sections, or to any data acquisition, processing, communication, recording or control module of a seismic data acquisition system equipped with a mating connector. No back-to-back connector or other adapter device is required to effect any of the connections. The connector design allows any cable section of the seismic data acquisition system to be connected to any type of cable section or module in the system and to properly serve the intended purpose either as a receiver-line cable, base-line cable or jumper cable, within the limits of its number of available conductors. Hence, the present cable connector is hereafter characterized as a universal hermaphroditic cable connector.

Additionally, the term "cable" as used herein is taken to mean a consolidated plurality of individual electrically conductive conduits, each electrically insulated from other conduits in the consolidated plurality.

The general configuration of the present hermaphroditic cable connector is substantially cylindrical. However, this is a geometry of convenience and not limitation. Octagonal or hexagonal prism structures may easily be adapted to the invention. An outer collar element having a substantially tubular configuration constructed of hard, structural plastic surrounds an inner cylindrical core of relatively soft, pliable plastic. The presently preferred embodiment of the invention provides a substantially symmetric relationship about a common axis of revolution between the outer collar element as a cylindrical annulus and a cylindrical inner core. Those of skill in the art, however, will recognize that the spirit of the invention may also be practiced with an axially asymmetric outer annulus.

The outer collar and inner core are substantially fixed relative to each other in the longitudinal, i.e. axial, direction. Rotatively, however, the outer collar is partially free relative to the inner core but preferably is resiliently biased to a relative angular default position.

The plurality of consolidated, electrically isolated (i.e. insulated) conduits comprising the cable assembly are secured to respective terminals that are embedded within the inner core in a manner to be subsequently described in greater detail. Entry of the conduits into the inner core is through one axial end of the core. The opposite axial end of the inner core is the interfacial end that axially meshes with another connector of another cable, a RAM, a BLU, etc. The corresponding distal end of the outer sleeve is configured to rotatively mesh with the distal end of the other connector sleeve. Rotative meshing of the outer sleeves respective to the two joined connectors prevents an undesired axial separation of the two axially meshed inner cores.

The end profile of the meshing axial end-face of the inner core is diametrically divided into two half-area sections. Each half-area section is divided into two or more parallel chord sections. The presently preferred embodiment provides two parallel chord sections in each half-area section but more may be accommodated. The core end-face is axially profiled to position the distal end-plane of one chord section of each half-area section in substantially the same, i.e. common, axially transverse plane. The distal end-planes respective to the two other chord sections are axially displaced from the common transverse plane in substantially equal but opposite axial directions.

For a complete seismic communication network, three design variants of the connector are required: the first is for the receiver-line and jumper cable sections, the second is for the base-line cable sections and the third is for all of the data acquisition, processing, communication, recording and control modules of the seismic data acquisition system. The receiver-line cable sections have conductors and take-outs for geophone array connections spaced along the cable; when two such cable sections are joined between two RAMs, the conductors carrying the geophone array signals must be blocked. At the RAMs the geophone array signals must be electrically connected. This is accomplished for the first design variant by using non-conductive plastic blocking-towers instead of conductive pins for the inner core of the connector in the receiver-line cable section. The blocking-towers also prevent moisture from entering the sockets and causing electrical leakage.

The second variant of the connector is equipped with conductive pins instead of plastic blocking-towers in the same conduit terminal positions in the inner connector core. This allows connection of all of the conductors as required to maximize transmission capacity of the base-line cable sections.

The third design variant of the connector is semi-permanently attached to all of the modules of the data acquisition system to allow cable connection. It is also designed for connection of all available conductors. These two variants of the universal connector differ from the first variant in the aspect of pins replacing blocking-towers.

The connector face is profiled with a protruding chord section ridge and a deep chord section recess that provides additional structural strength and physical protection for the protruding pins and the connector itself. The design of the connector face is such that one such connector may be mated with an identical connector or with one of the other two variants of the connector.

Hard thermoplastic polyurethane (TPU) resin is injection molded to form the connector base which holds the metal pins and sockets on the front side with integral containing-towers. The blocking-towers are also integral to the base. Soft TPU resin is injection molded onto the connector base to form the front of the connector. The front is chemically bonded to the back. The soft plastic of the front encloses the sockets and partially encloses the containing-towers and blocking-towers, providing structural strength and protection from potential invading water and other contaminants.

Other components of the cable connector include a hermaphroditic collar enclosing a potting cup, base and front of the connector. The collar allows quick coupling and decoupling of the connector and is designed so that the connector may only be joined to another connector in the correct orientation.

BRIEF DESCRIPTION OF THE SEVERAL VIEWS OF THE DRAWINGS

Other features and advantages of the invention will be recognized and understood by those of skill in the art from reading the following description of the preferred embodiments and referring to the accompanying drawings wherein like reference characters designate like or similar elements throughout the several figures of the drawings and wherein:

FIGS. 3a and 3b respectively illustrate opposing faces of the universal seismic cable connector configured as a component of a receiver-line or jumper cable section, prior to mating, illustrating its hermaphroditic configuration;

DETAILED DESCRIPTION OF THE INVENTION

Figure 1A:
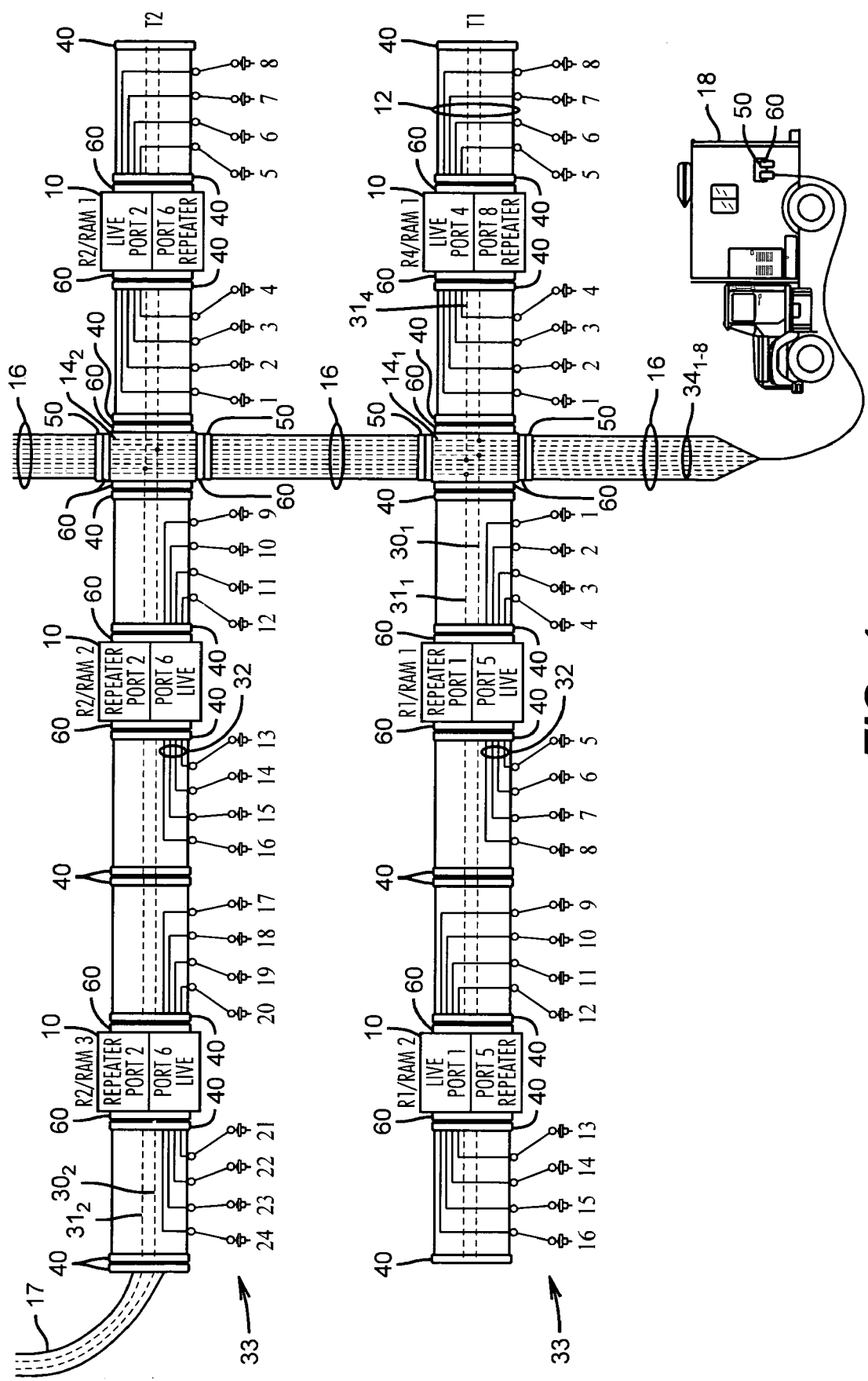
FIG. 1a is a first portion of a schematic drawing of the invention as deployed for a 3D survey.
Figure 1B:
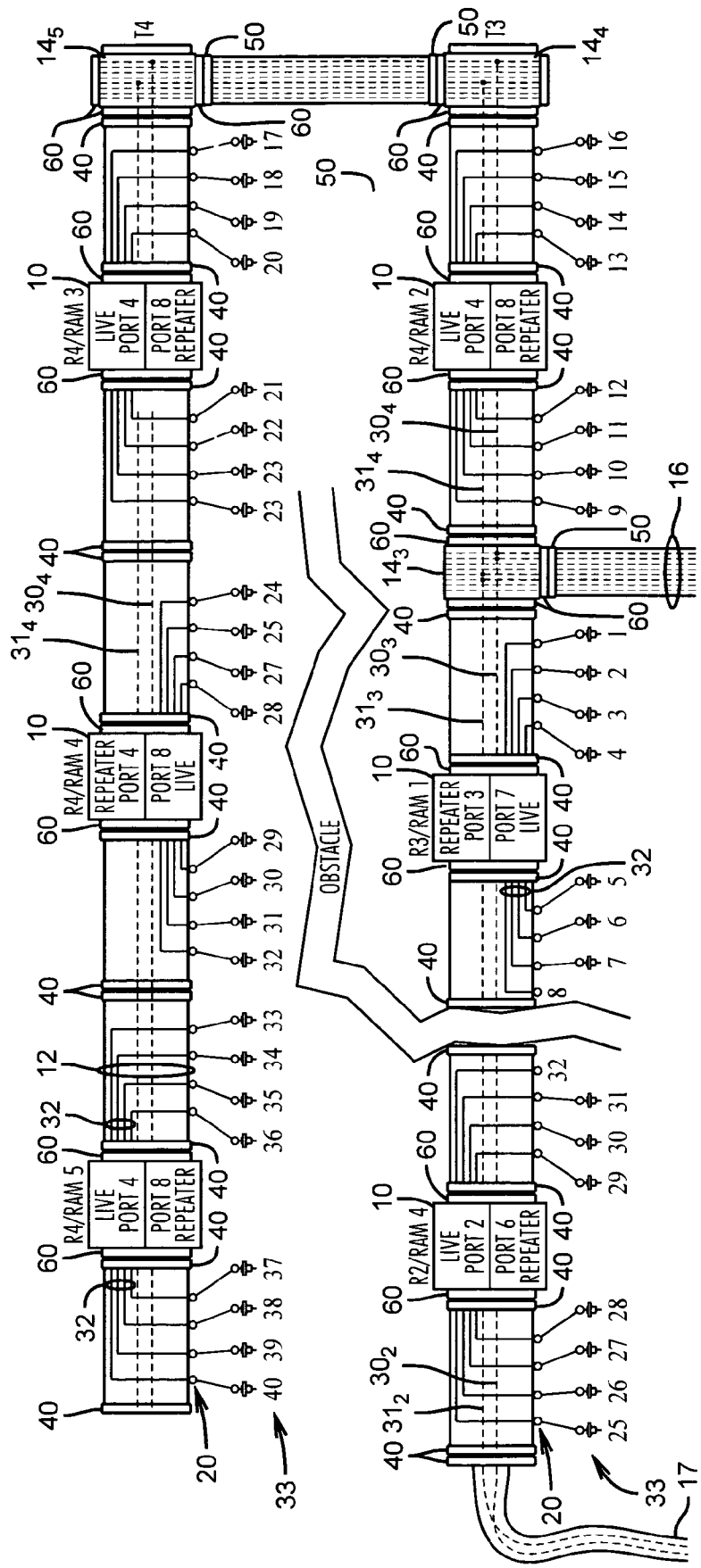
FIG. 1b is the remainder of a schematic drawing of the invention as deployed for a 3D survey.

FIGS. 1a and 1b schematically illustrate a model seismic survey matrix according to the invention wherein geophones are distributed over the terrain of interest in an orderly manner of period and spacing and the universal seismic cable connector (abbreviated to USCC) (40, 50 and 60) is used to electrically and physically connect all of the various modules and cable sections that are shown. For this example, the geophone arrays are aligned in four receiver rows: T1, T2, T3 and T4. Because of physical obstacles, however, it is convenient to organize the seismic data acquisition network into four logical receiver-lines that do not correspond exactly to the four physical rows of geophone arrays. The logical receiver-lines are designated as R1 through R4. The left side of ROW T1 corresponds to logical receiver-line R1. The right side of ROW T1, however, is operatively integral with logical receiver-line R4. ROW T2 contains part of R2 but a jumper cable section 17 connects a RAM on ROW T3 to R2 also. ROW T3 also contains the short receiver-line R3 and a portion of R4. The remainder of R4 is on ROW T4, joined by a base-line cable section 16, used instead of an unavailable jumper cable section to expedite the project. No adapters such as prior art back-to-back connectors are required to enable any of the required connections (for an example of the prior art layout see U.S. patent application Ser. No. 10/162,243). The available seismic equipment has been best utilized to overcome physical obstacles that prevent layout of a simple grid in which physical rows correspond exactly to logical receiver-lines. This may be accomplished only if the various types of modules may be connected to any of the three types of cable sections and still retain their functionality.

Distributed along each of the geophone rows are three RAMs 10. The RAMs are connected by two receiver-line cable sections 12 respective to an "A" side and a "B" side of each RAM 10. A receiver-line cable section 12, in this example, comprises four pairs of geophone channel conduits and five pairs of communication conduits, surrounding a stress carrying core element. Two of these five pairs are dedicated to digital telemetry of seismic data and command/control signals, while the remaining three pairs may be used for voice communication, controlling a seismic source, or may be idle but available for use as spares in event of damage to any of the other pairs. Only the two digital telemetry pairs (30 and 31) are shown on FIGS. 1a and 1b, each indicated by a single dotted line. The nine pairs of receiver-line conduit are aligned within an insulation annulus and encased by a shield jacket. The receiver-line cable section is terminated at both ends with a USCC 40. This cable connector allows connection of the receiver-line cable section 12 to any RAM 10, BLU 14, or to the CRU 18 as shown in FIGS. 1a and 1b, or to any type of cable section (12, 16 or 17). The positions of unused pairs are retained on the USCC 40 but are electrically blocked to allow use of a connector of the same physical form for all types of cable sections in the system, including receiver-line 12, base-line 16 and jumper cable sections 17.

Referring to FIG. 1a, the two receiver-line cable sections respective to RAMs R1/RAM 1 and R1/RAM 2 in receiver-line R1 are mutually joined by their respective receiver-line cable connectors, USCC 40. In prior art systems an adapter called a back-to-back connector was required to join two such cable sections. The coupled pair of USCCs 40 provides continuity between communication conduits 30 and 31 of connected receiver-line cables 12 but not between the geophone channel conduits 32. Each of the four geophone channel conduits 32 in a single cable section respectively connects to only one RAM, maintaining integrity of the sensor array geometry as required. Hence, each RAM receives up to eight geophone channels in this preferred embodiment example (four from each side).

It is common industry practice for each geophone channel 32 to be connected with a plurality of geophone arrays 33. Each of the geophone arrays 33 respective to a given channel 32 has a predetermined position relative to the seismic disturbance location whereby those commonly connected geophones forming an array all receive substantially the same subsurface reflection signal thereby (through summation) reinforcing the signal strength but receive substantially different seismic noise, thereby attenuating noise when summed.

Usually, not always, the geophone signals through the channels 32 are analog: analog-to-digital conversion being performed by the RAM 10. However, A/D conversion by dedicated circuitry in individual geophone units is an available alternative and is advantageous under certain circumstances. In this case the RAM is not required for the digitization process but must still perform control, communication, timing and data management processes.

Again referring to FIGS. 1a and 1b, BLUs 14$_1$, 14$_2$ and 14$_3$ join the receiver-lines R1, R2, R3 and R4 to a base-line cable 16.

The base-line cable section 16 comprises, in this example, thirteen pairs of conduits with eight dedicated to digital telemetry of seismic data and command/control signals (34$_{1-8}$) while the remaining five pairs may be used for voice communication, controlling a seismic source, or may be idle but available for use as spares in event of damage to any of the other pairs. (Only the eight dedicated to digital telemetry are shown in FIGS. 1a and 1b.) The conduits are contained within an insulation annulus and shield jacket. At the core of the assembly may be a stress carrying core. A USCC 50 terminates both ends of a base-line cable section 16, allowing connection to any type of module or cable section in the system. The USCC 50 is physically identical to the USCC 40 used in the receiver-line 12 and jumper cable sections 17 except for the use of pins instead of blocking-towers for certain channels, facilitating full inter-connectability of all equipment in the system.

Shown in FIG. 1a is a base-line cable section 16 joining BLUs 14₄ and 14₅. The use of a base-line cable section 16 instead of receiver-line cable section 12 to connect RAMs that are on the same logical receiver-line, as in this example, illustrates one aspect of the inter-connectability and adaptability of the system.

The eight communication conduits $34_{1-8}$ connect the geophone field matrix to a CRU 18 (FIG. 1a) that is often carried in a vehicle for mobility. Depending on the data processing capacity of the CRU 18, one or more base-lines 16 may serve a CRU 18. There are eight dedicated seismic data communication conduit pairs $34_{1-8}$ in the base-line cable section 16 and two communication conduit pairs (30 and 31) in each receiver-line cable section 12. Geophone data will be reported to the CRU 18 along the four receiver-lines R1 through R4 and then via the base-line. Two of the eight communication conduit pairs of the base-line are made available to each active receiver-line ensuring a one-to-one correspondence between receiver-line and base-line conduits that are utilized.

Receiver-line R1 serves RAMs R1/RAM 1 and R1/RAM 2. Data from geophone channels 1-8 connected to RAM R1/RAM 1 is initially processed by that RAM and transmitted along receiver-line communication conduit $30_1$ to base-line communication conduit $34_5$. The data produced by geophone channels 9-16 of receiver-line R1 is processed by RAM R1/RAM 2 and transmitted along receiver-line communication conduit $31_1$ to base-line communication conduit $34_1$.

Receiver-line R2 serves RAMs R2/RAM 1, R2/RAM 2 and R2/RAM 3 in ROW T2 and RAM R2/RAM 4 in ROW T3. The communication conduits $30_2$ and $31_2$ respective to the cable sections for ROWs T2 and T3 are linked by a jumper cable section 17. The jumper cable section 17 contains only two communication conduit pairs and no geophone channel conduits. It may be used to connect the ends of two receiver-lines to form a loop or to extend a receiver line through an area not requiring geophones. The data of geophone channels 9-16 in receiver-line R2 is transmitted by R2/RAM 2 and channels 17-24 in receiver-line R2 is transmitted by R2/RAM 3 along receiver-line communication conduit $30_2$ to base-line communication conduit $34_6$. The data of geophone channels 25-31 in receiver-line R2 of ROW T3 is transmitted by R2/RAM 4 along receiver-line communication conduit $31_2$ to base-line communication conduit $34_2$. Also, geophone data from channels 1-8 of receiver-line R2 is transmitted by R2/RAM 1 along communication conduit $31_2$ to base-line communication conduit $34_2$.

Receiver-line R3 in ROW T3 serves only geophones 1-7 which are signal processed by R3/RAM 1. The data is transmitted along receiver-line communication conduit $31_3$ to base-line communication conduit $34_3$. Notably, since receiver-line R3 serves only one RAM, i.e. R3/RAM 1, the communication pair $31_3$ is not used. Consequently, the base-line communication conduit $34_3$ in the respective receiver-line cable section 12 is also not used.

Receiver-line R4 serves R4/RAM 1 in ROW T1, R4/RAM2 in ROW T3 and R4/RAM 3, R4/RAM 4 and R4/RAM 5 in ROW T4. Geophone channels 25-32 in receiver-line R4 (ROW T4) are connected to R4/RAM 4 for data transmission along receiver-line communication conduit $30_4$ to base-line communication conduit $34_8$.

Receiver-line communication conduit $31_4$ receives the data of geophone channels 1-8 in receiver-line R4 of ROW T1; channels 17-24 in receiver-line R4 of ROW T4; channels 33-40 in receiver-line R4 of ROW T4 and channels 9-16 in receiver line R4 of Row T3 for transmission to the CRU along base-line communication conduit $34_4$.

The seismic data acquisition example depicted in FIGS. 1a and 1b provides an example of the context in which the three design variants of the present USCC (40, 50 and 60) are beneficially applied. The USCC 40 allows an inter-cable connection of the plurality of electrical conduits within each cable while blocking the continuity of geophone channel conduits. Alternatively, when connected to a RAM 10, the geophone signal carrying conduits transfer the geophone signal into the RAM processing circuitry. As used herein, the term "cable" is meant to include a consolidated or bundled plurality of electrically isolated conduits. Electrically isolated usually means insulated. For the BLUs 14 and other communication, recording and control modules, connection of all available conductors is required in order to maximize the transmission capacity and this is provided by USCC 50 on base-line cable sections 16 and USCC 60 on modules. Because of the USCC's ability to connect any type of cable section to any type of data acquisition module, while retaining functionality, a seismic field crew is able to take advantage of a limited supply of available equipment to cover the survey area as required and to overcome the limitations imposed by difficult terrain and other access restrictions. No adapters such as back-to-back connectors are necessary and only one type of cable connector, the USCC, is required, simplifying and reducing the task of deployment of the seismic field system. The capabilities made possible by the USCC and not available with prior art seismic cable connectors result in a more efficient and cost-effective data acquisition project.

Figure 2:
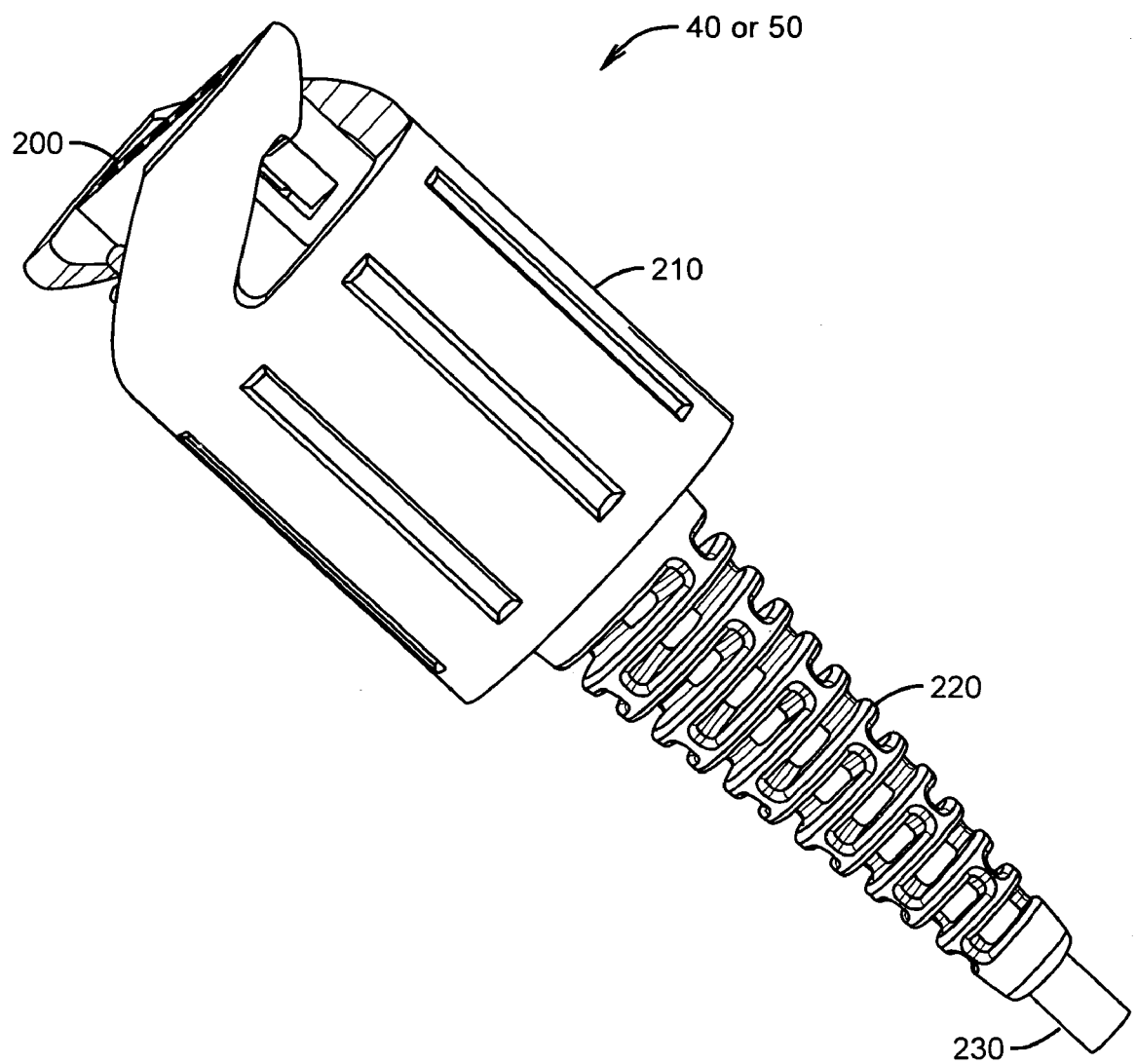
FIG. 2 is a view of the universal seismic cable connector.

The USCC (40 or 50) is shown in FIG. 2. A portion of the connector inner core end-face 200 is visible where it protrudes above the hermaphroditic quick-locking collar 210 (outer annulus) that surrounds and protects the main body (inner core) of the connector. The strain relief handle 220 emerges from the rear of the collar 210. The handle 220 surrounds and protects the terminus of the receiver-line cable segment 230 which may be seen at the bottom of FIG. 2. It enables the terminus of the cable to withstand repeated flexures and other physical stresses to which it is normally subjected during field operations.

Figure 4:
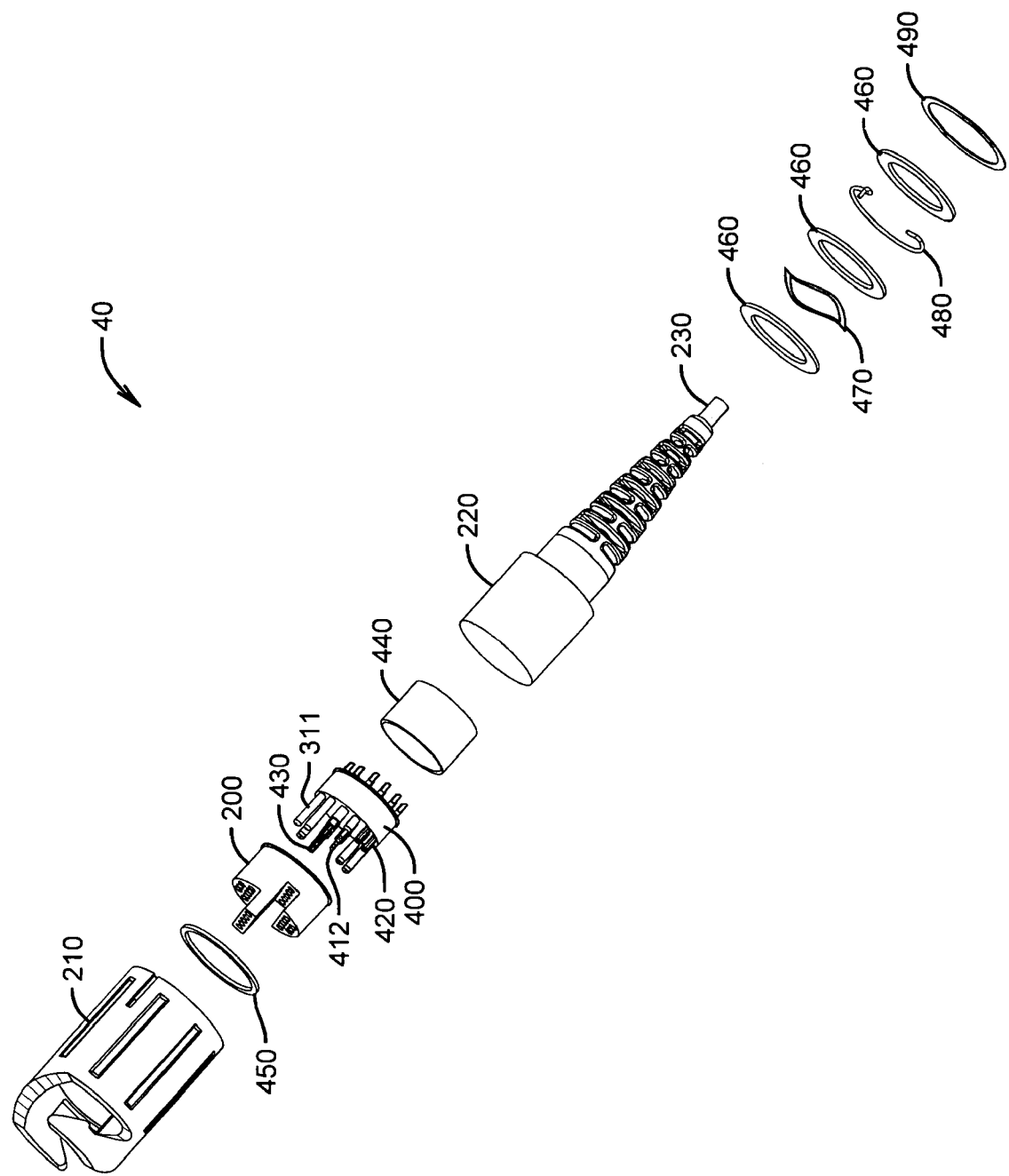
FIG. 4 is an exploded view of the universal seismic cable connector configured as a component of a receiver-line or jumper cable section.

The principle component parts of the USCC 40 are shown individually in the exploded view of FIG. 4.

FIGS. 3a and b respectively view the opposing interface ends of two identical USCCs 40 prior to mating. These FIGURES illustrate the hermaphroditic configuration that is required for universal connectability. The USCC face of FIG. 3a on the left is identical to the face of FIG. 3b on the right but has been rotated 180 degrees in the vertical plane. In this view, the hermaphroditic quick-locking collar 210 (outer annulus) appears as a circular ring around the face of the connector. In this plan view, the soft plastic distal end-face 200 of the connector is transversely divided diametrically into two half-area sections. Each of the two half-area sections is divided into two parallel chord segments. A protruding ridge chord segment 340 of one half-area section is contiguously aligned with a deep recess chord segment 350 of the other half-area section. The contiguous ridge and recess chord sections 340 and 350 are respectively flanked by chord segments 610 and 620 having distal end-face panes substantially midway between the end-face plane of the ridge chord segment 340 and the end-face plane of the recess chord segment 350. Five cable conductor terminal pins 310, for example, may be aligned on the deep recess 340 segment of each of the two connectors whereas five socket terminals 320, for example, may likewise be aligned on the protruding ridge 350 segments. Each connector's first intermediate level 610 segment has four blocking-towers 311 and four sockets 320, arranged with three of the blocking-towers on the interior side of the segment and one on the exterior side. Each connector's second intermediate level 620 segment also has four blocking-towers 311 and four sockets 320, but arranged with two of the blocking-towers on the interior side of the segment and two on the exterior side. A segment of the cable 230 itself is visible behind each of the connectors.

The two USCCs 40 of FIGS. 3a and 3b, when rotated 90 degrees in the horizontal plane toward each other, are aligned perfectly for connection. The protruding ridge 340 of each connector inserts into the deep recess 350 of the opposing connector. Each pin 310 aligns with a corresponding socket 320. Each blocking-tower 311 also aligns with a corresponding socket 320. The connectors are pushed toward each other and coupled when the operator manually rotates the two collars 210. Any misalignment is automatically corrected before coupling by the action of the two collars 210. As the connector is equally endowed with pins and sockets and can mate with a copy of itself it is termed hermaphroditic.

In FIG. 4 the USCC 40 is shown in an exploded view, revealing the configuration of the component parts. The hermaphroditic quick-locking collar 210 surrounds the soft plastic connector face 200 and other internal components when assembled and serves multiple roles. The collar 210 (outer annulus) is constructed of a hard plastic material that is able to withstand rough handling and other physical abuse while protecting the interior components. As stated in the previous section, it also enables quick and correct coupling by ensuring the opposing connectors are perfectly aligned before mating. It is not chemically bonded to the interior components.

The soft plastic connector face 200 with its protruding chord ridge 340 is shown below the collar 210. Below it is the hard plastic receiver-line connector base 400. Containing-towers 412 and blocking-towers 311 rise above the main body of the connector base 311. Junction terminals for each of the signal conduits in the cable assembly comprise either metal socket assemblies 420 or pin assemblies 430. These terminals are shown as inserted through the connector base 400. Beneath these terminal assemblies are the potting cup 440 and the strain relief handle 220. A receiver-line cable section 12 will be terminated at each end with identical USCC 40, as will the jumper cable section 17.

Figure 5:
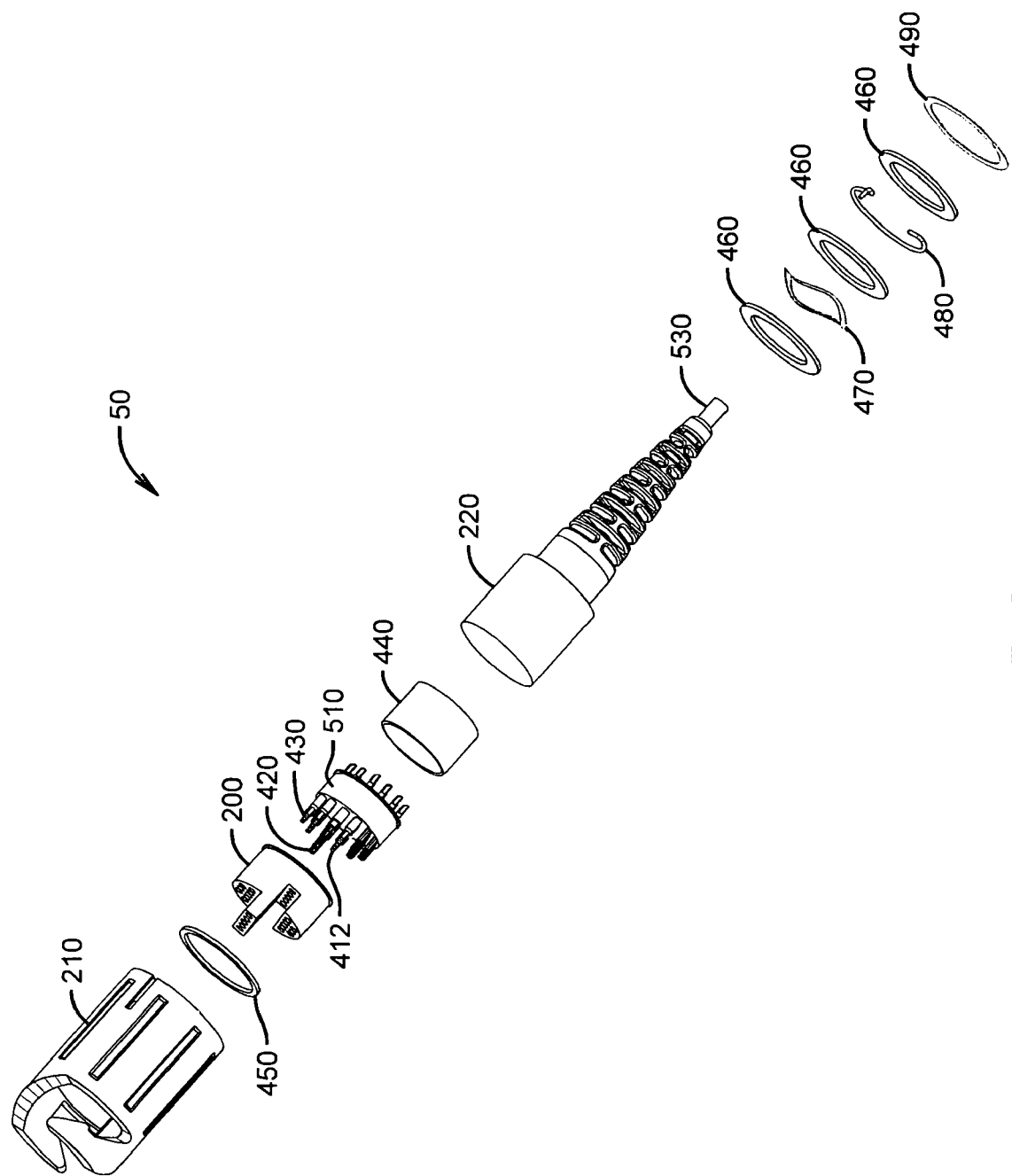
FIG. 5 is an exploded view of the universal seismic cable connector configured as a component of a base-line cable section.

The drawing in FIG. 5 depicts the USCC 50, the variant of the USCC used for construction of base-line cable sections 16. It is identical to the USCC 40, shown in the previous figure, except for the configuration of the hard plastic connector base and the number of pin assemblies 430. The base-line connector base 510 possesses no blocking-towers 311, but only containing-towers 412. This version of the base is designed to have pin assemblies instead of the blocking-towers, so that all available conduit pairs may be connected. Thus it has 8 more pin assemblies and 8 more containing-towers 412 than the USCC 40.

Figure 7:
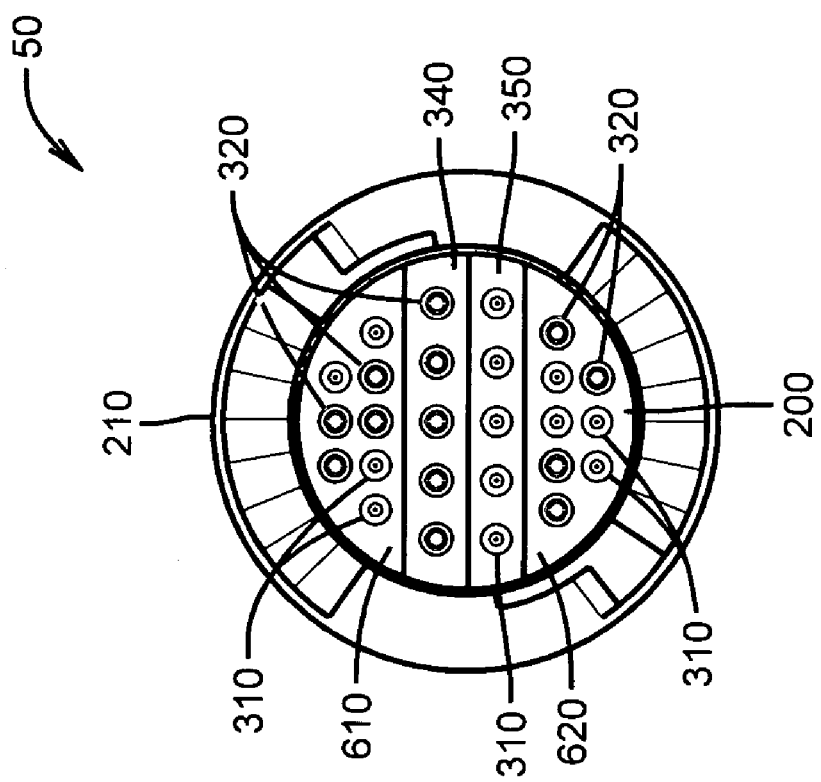
FIG. 7 is a plan view of the face of the universal seismic cable connector configured as a component of a base-line cable section.
Figure 6:
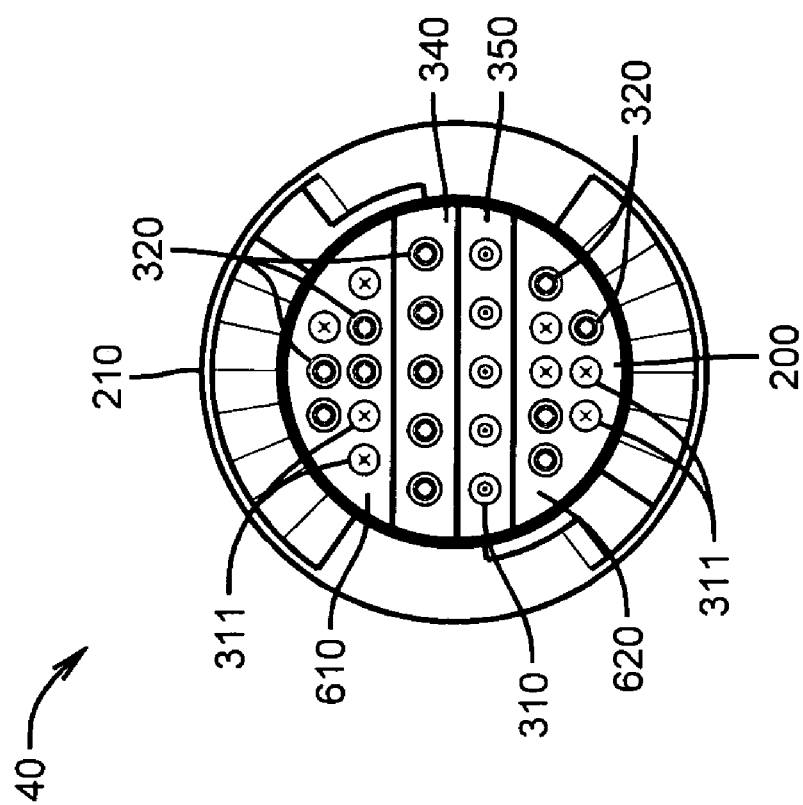
FIG. 6 is a plan view of the face of the universal seismic cable connector configured as a component of a receiver-line cable section.

FIG. 6 and FIG. 7 are plan views of the faces of the USCC 40 and the USCC 50 respectively. There are no differences in the following features of the connector faces for these two variants of the USCC: the four chord segments of the soft plastic connector face 200, including the protruding ridge 340 segment, the deep recess 350 segment, the first intermediate level 610 segment, and the second intermediate level 620 segment; the hermaphroditic quick-locking collar 210; all of the sockets 320; and the pins 310 in the deep recess 350 segment. However the USCC 40 has 8 blocking-towers 311 whereas the USCC 50 has instead of these blocking-towers, 8 pins 310. Thus the USCC 40 blocks transmission on 4 conduit pairs and the USCC 50 provides electrical continuity for the same 4 conduit pairs.

The designs of these two variants of the USCC 40 and USCC 50 thus serve the intended purposes as stated below. The receiver-line cable section 12 is terminated at each end with the USCC 40 which blocks the geophone signal conduits when connected to another receiver-line cable section, yet allows electrical continuity of these conduits when connected to the RAM 10. The base-line cable section 16 is terminated at each end with the USCC 50 and connects all available conduit pairs as is required to maximize communication capacity. The two connectors USCC 40 and USCC 50 may be connected to each other or to any USCC 60 connector, the third variant in the seismic system of this invention, providing complete inter-connectability of all types of cable sections and modules.

Figure 8A:
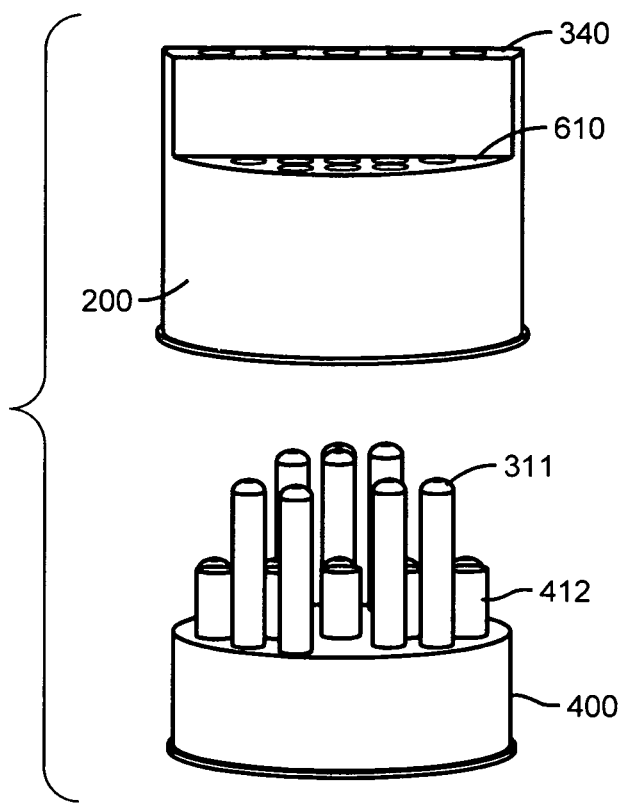
FIGS. 8a and 8b respectively illustrate two profile views of the front and back elements of the cable connector configured as a component of a receiver-line cable section with containing-towers and blocking-towers.
Figure 8B:
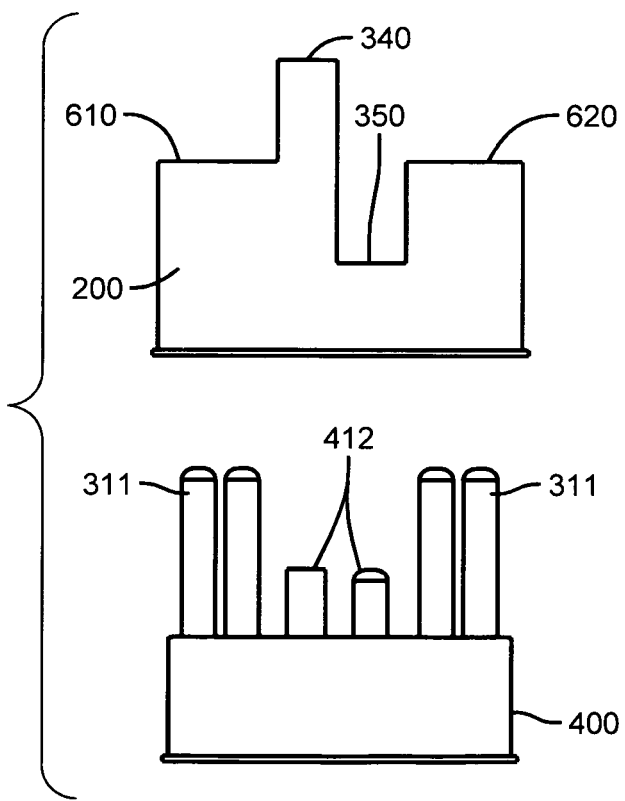

FIGS. 8a and 8b provide two profile views of the receiver-line connector (USCC 40) face 200 and base 400. The connector face 200 and base 400 of FIG. 8b is the same connector face 200 and base 400 of FIG. 8a except viewed from a plane 90° of the FIG. 8a profile plane. The tall blocking-towers 311 and the short containing-towers 412 are clearly visible in both views. The tops of the containing-towers 412 show a slightly different shape depending on whether they are for containing pin assemblies 430 or socket assemblies 420, with the containing-towers for pin assemblies having a rounded top and the containing-towers for socket assemblies having a flat top. FIG. 8b reveals the height of the protruding ridge 340 over the intermediate-levels 610 and 620; and the equidistant depth of the deep recess 350. The containing-towers for the pin assemblies 430 have sufficient height to protrude above the level of the deep recess 350 segment and thus are able to provide additional structural support for the exposed pins. The blocking-towers 311 rise even further than this, above the intermediate level segments (610 and 611), so that they can sufficiently penetrate the opposing sockets 320 when connected and effectively plug them against moisture penetration.

The face of the front of the connector, with its three elevations and four parallel chord segments, is arranged such that, when connected, additional structural strength is provided to protect against physical damage under severe shear, compressional, tensional and vibrational forces. The blocking towers 311 also provide structural support for the connector when it is connected. Protruding pins used for the receiver line telemetry channels, being situated in the deep recess, are protected from physical damage while the connector is exposed during transportation and while connected. Sockets and blocking-towers or pins for geophone arrays are positioned at the two intermediate levels of the face, on both sides and above the deep recess, but below the protruding ridge. They are protected also, but less so than the telemetry channel pins. The containing towers do provide protection for them as well as the enclosing soft connector face. Only sockets are positioned on the protruding ridge, the most exposed position on the front of the connector, as they are less subject to physical damage than pins. A greater degree of protection from physical damage is provided to all of the pins and sockets by the design of the USCC connectors than by the prior art connectors.

Figure 9A:
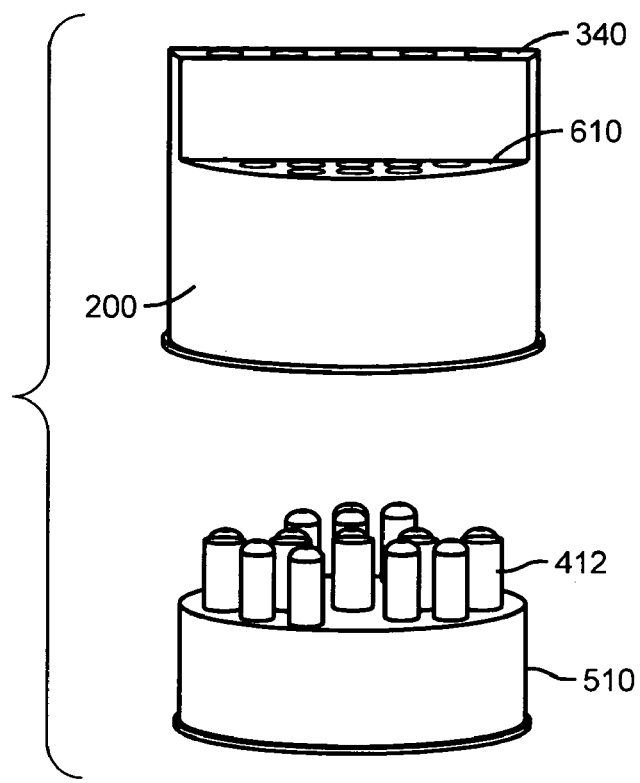
FIGS. 9a and 9b respectively illustrate two profile views of the front and back elements of the cable connector configured as a component of a base-line cable section with pins and containing-towers (but no blocking-towers)
Figure 9B:
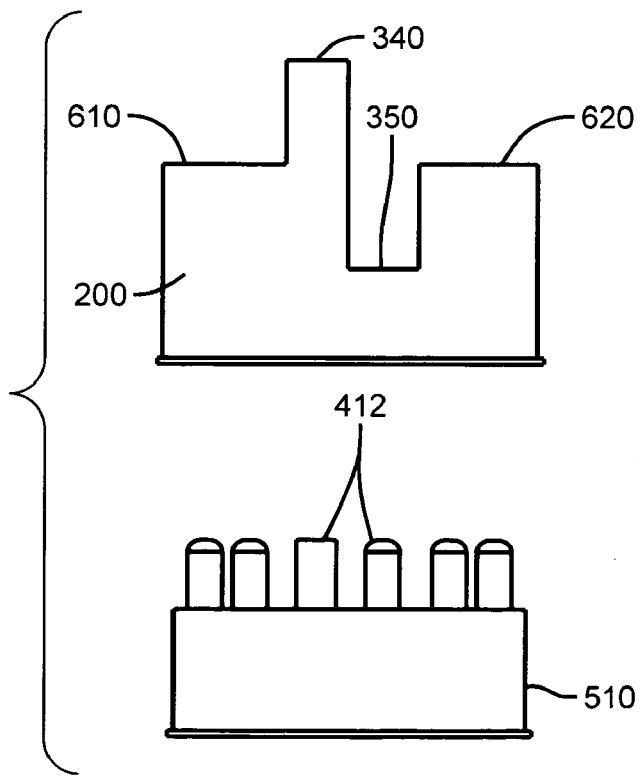

FIGS. 9a and 9b provide corresponding profile views of the base-line connector (USCC 50) face 200 and base 510. There are no blocking-towers 311 but in their place are additional pin containing-towers 412. Other features are identical to those in the previous two figures. It may be noted that in the manufacturing process, the two parts, shown separately in the profile views, connector face 200 and connector base 510, are not built separately and combined as might be assumed from these drawings. Instead the connector base (400 and 510) is formed by injection molding over the socket and pin assemblies (420 and 430) and so that they are contained and held firmly by the base; then the connector face 200 is injection molded over the top and sides of the connector base to form one inseparable combined piece with pins emergent above their containing-towers and metal ends of pin and socket assemblies emergent below the back side of the connector base, ready for connection to the appropriate conducting wires.

Figure 10:
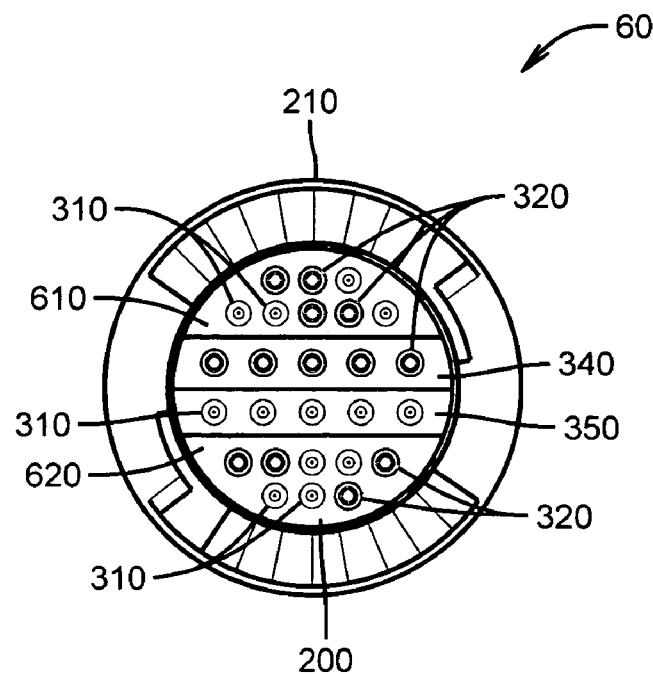
FIG. 10 is a plan view of the face of the universal seismic cable connector configured as a component of the RAM, BLU or CRU for connection of a receiver-line or a base-line cable section.

FIG. 10 provides a plan view of the face of the USCC 60 configured as a component of the RAM 10, BLU 14, CRU 18 or of any other data processing, communication, recording or control module of the seismic system. In this view the USCC 60 connector appears identical in every detail to the USCC 50 shown in FIG. 7. Because it is designed for semi-permanent attachment to an equipment module instead of a cable, the USCC 60 does differ from the USCC 40 and USCC 50 on the opposing side of the connector. The USCC 60 of course has the same universal connectability as the USCC 40 and USCC 50, allowing attachment to a base-line cable section 16, a receiver-line cable section 12 or a jumper cable section 17.

Figure 11:
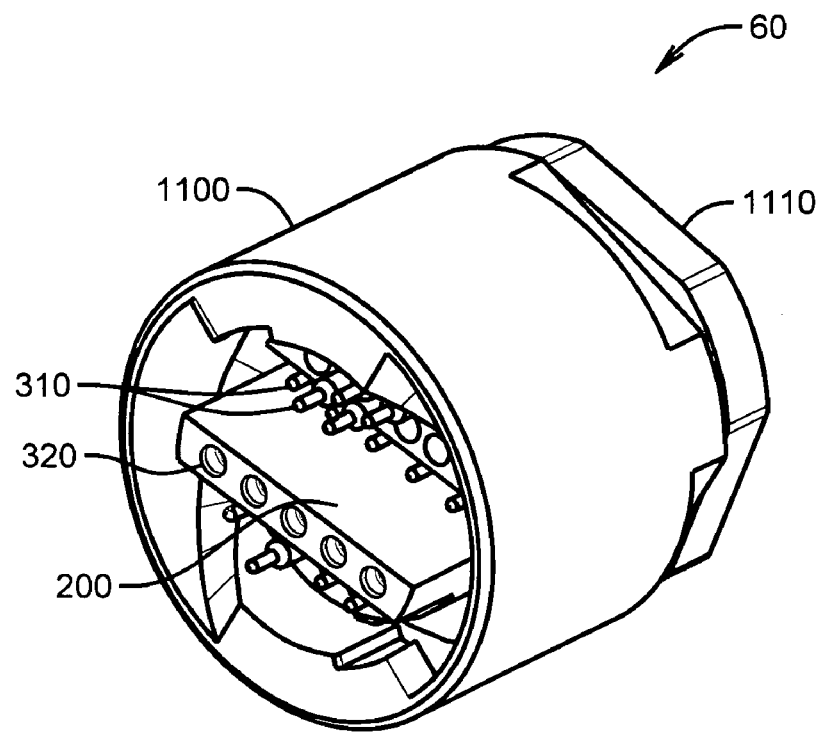
FIG. 11 is a pictorial view of the universal seismic cable connector configured as a component of a RAM, BLU or CRU for connection to a receiver-line cable section, jumper cable section or base-line cable section.

FIG. 11 provides a view of the entire USCC 60 assembled and ready for attachment to a module. The module connecting collar 1100 surrounds the quick-locking collar 210 of the mating USCC (40 or 50). It contains internal tines and locking tabs that lock with the collar tines 1300 of the mating USCC, just as when two cables are mated. Compressional force and rotational motion are applied by the user to effect the mating of a USCC (40 or 50) to the USCC 60, just as when two cables are mated. The force of the return spring 480 and wave washer spring 470 in the USCC (40 or 50) are overcome and the locking tabs hold the connectors in the locked position until the operator reverses the process and disconnects them.

Figure 12:
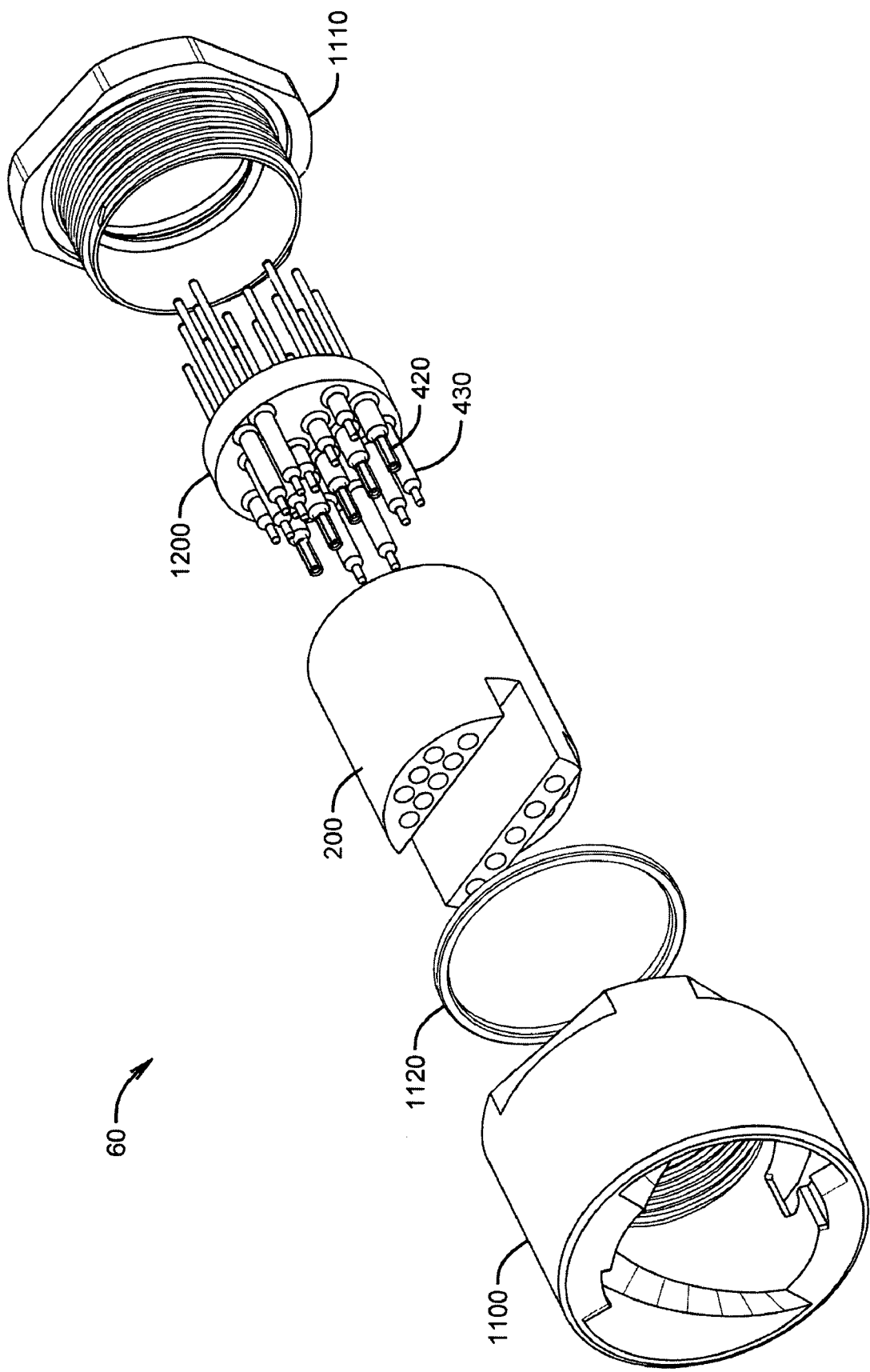
FIG. 12 is an exploded view of the universal seismic cable connector configured as a component of a RAM, BLU or CRU for connection to a receiver-line cable section, jumper cable section or base-line cable section.

FIG. 12 is an exploded view of the USCC 60 revealing the component parts. The module O-ring 1120 separates the module connector collar 1100 from the module flange 1110 after assembly and prevents entry of water and other contaminants. The connector face 200 and module connector base 1200 are the same as the corresponding parts in the USCC 40, because there are no blocking towers in the USCC 60 as all channels from the cable are potentially necessary to connect.

Manufacture of the USCC (40, 50 and 60) is discussed in the following section. Hard thermoplastic polyurethane (TPU) resin is injection molded to form the connector base (400 and 510). Soft TPU resin is injection molded onto the connector base to form the face of the connector 200. The face is chemically bonded to the base. The soft plastic of the front 200 encloses the sockets 320 and partially encloses the containing towers 412 and blocking towers 311, both of which are integral to the base 400/510 and formed when it is molded. The containing towers 412 protrude for a distance of from one half to one fourth of the length of the pin or socket from the front platform of the base (400 and 510). Metal socket and pin assemblies (420 and 430) are contoured within their respective containing towers 412. After molding they protrude from the back side of the base (400 and 510). The individual wires (conduits) of the cable 230 or 530 are connected to the correct socket or pin assembly terminals (420 and 430). Each conductor of the cable 230 that is to be blocked from electrical connection when that cable 230 is connected to another cable 230 is joined to a socket 320. When the USCC 40 is connected to another USCC 40 (as when two receiver line cables are connected to each other) conduction will be blocked by a plastic blocking tower 311 of the other USCC 40. But when the USCC 40 is connected to a USCC 60 (at a RAM 10) the socket 320 is penetrated by a conductive pin 310 and electrical continuity is achieved. These connections on the back side of the base are sealed within a potting cup 440 by a non-conducting potting compound. Referring to the USCC 40, solid hard plastic towers 311 of greater height protrude from the front side of the base for each conductor wire of the cable that is to be blocked from electrical connection. The height, width and composition of these blocking towers is designed to allow them to tightly plug the corresponding unused sockets on the facing connector when the two connectors are coupled for use, preventing invasion by water, dirt or other contaminants.

When two USCC 40 are connected, the blocking-towers prevent electrical connection of the geophone channels. When the USCC 40 is connected to any module, the unit will have a USCC 60 equipped with metal pins instead of hard plastic blocking-towers and the geophone channels will be connected. Thus a USCC 40 can be affixed at both ends of the receiver-line cable section 12 and be connected freely to either another cable-section connector or to a connector of any module of the seismic data acquisition system.

Other components of the cable connector (configured for semi-permanent attachment to a cable) include a strain relief handle 220 at the end of the cable where it enters the connector, and a hermaphroditic collar 210 enclosing the potting cup 440, base and front of the connector. The strain relief handle protects the end of the cable at and near its entry into the potting cup of the connector and allows repeated flexures without causing damage to the cable components or connector. The hermaphroditic collar allows quick coupling and decoupling of the connector. It is designed so that the connector may only be joined to another connector of the same design family (USCC 40, 50 or 60), and only in the correct orientation. A self-correcting alignment feature requires the user to rotate the connector into the correct radial position to initiate the mating process. After this initial rotation the two connectors are compressed and further rotated until locked. As he prepares to join two connectors, the user can easily see the correct initial orientation, improving efficiency of the process. The total process of mating is also very easy and efficient, thereby improving field productivity relative to prior art connectors.

Figure 13:
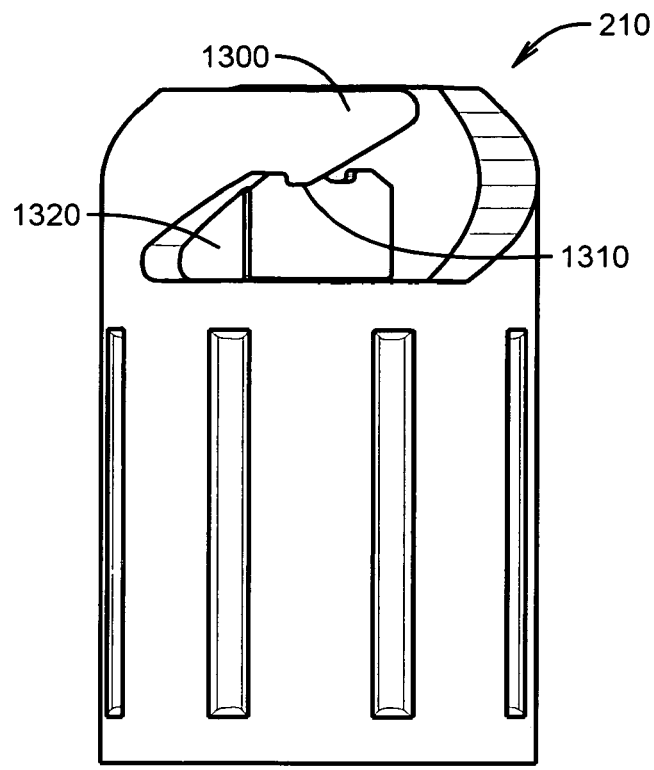
FIG. 13 is a profile view of the quick-connecting collar showing the collar tine, collar locking tab and tine gusset.
Figure 14:
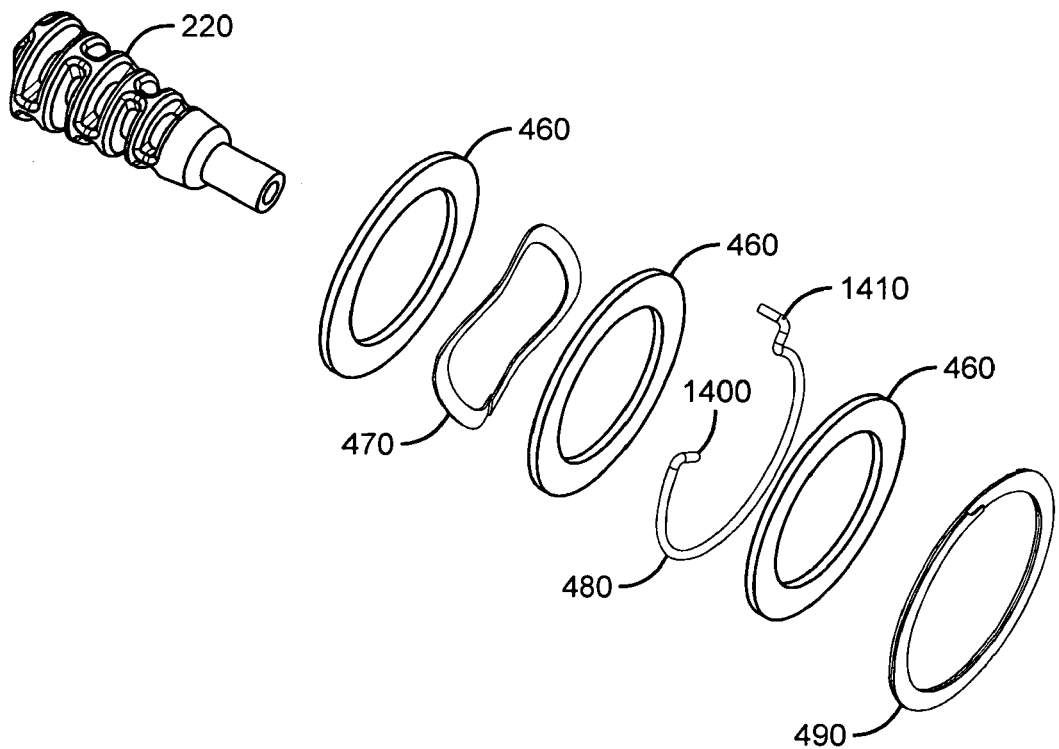
FIG. 14 is an exploded view of a subset of the universal seismic cable connector components showing the configuration of the wave-washer spring and the return spring.
Figure 15:
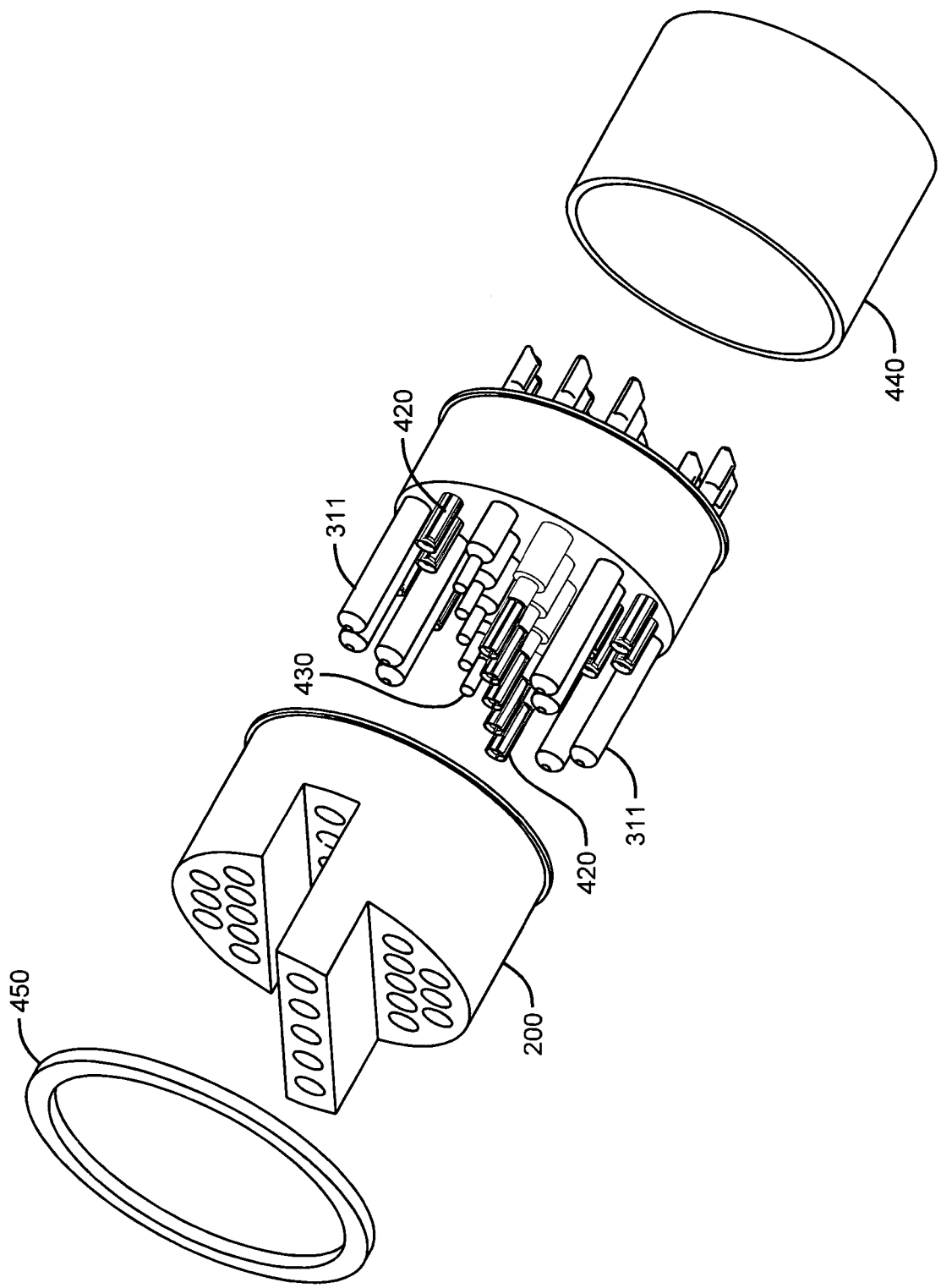
FIG. 15 is an exploded view of a subset of the universal seismic cable connector components showing detail of the pin and sockets assemblies and blocking towers.

FIG. 13 is a profile view of the hermaphroditic quick-connecting collar 210 showing one of the two collar tines 1300. The collar tine is notched such that its tip serves as a collar locking tab 1310. The collar tine is supported and strengthened by a tine gusset 1320. Compressional force must be applied by the user to connect two of the universal seismic connectors because of the action of the wave washer springs 470 as shown in FIGS. 4 and 14. Sufficient force must be applied to allow the four tine gussets, two from each of the two connectors, to slide past each other. Then, when the operator stops applying compressional force, the two connectors remain in the mated position and can not rotate relative to each other because of the stopping action of the paired collar locking tabs 1310. To disengage the two connectors the operator simply reapplies compressional force and rotates so that the paired collar locking taps can slide past each other, allowing disconnection in a very efficient manner. This efficiency results in a more productive field operation which is one of the objectives of the invention.

The return spring 480 as shown in FIG. 14 also plays an active role during the mating and disengaging of two universal seismic connectors. The return spring external prong 1410 is held by a cavity in the quick-locking collar 210; the return spring internal prong 1400 is held by a cavity in the body of the connector. Thus the spring applies force to attempt to return the quick-locking collar 210 to the position it has when disconnected. The operator overcomes the action of this spring while mating two connectors and the action of the spring aids during disconnection and then holds the quick-locking collar in the open position after disconnection. The rotational position of the quick-locking collar 210 relative to the connector face 200, due to the action of the return spring 480, is always perfectly oriented for the next mating when the universal seismic connector (40, 50 and 60) is not joined to another connector. Thus the user can very efficiently join the various cables and modules in the field, improving productivity of the field operation relative to the prior art.

As shown in FIGS. 4, 5 and 14, the three washers 460 enclose the wave washer spring 470 and return spring 480. Washer 490 is positioned below the third washer 460. Collar washer 450 is positioned above the first washer 460. All of these washers prevent the collar 210 from contacting the connector body and reduce rotational friction during the connection and disconnection of the USCC. They also serve to block entry of water and other contaminants into the USCC; both when connected and when disconnected Socket washers are positioned during manufacture in each of the socket assemblies 420. Two of these very small washers are permanently emplaced in each socket assembly. These washers serve to block entry of water and other contaminants into the socket while the connector is connected. After connection the socket washers are in contact with the plastic containing towers 412 and blocking towers 311. For operation in extremely cold, e.g. Arctic winter conditions, these socket washers are not useful and are removed. For deep underwater applications an additional socket washer can be added for a total of three per socket assembly to provide reinforced water blocking.

Although our invention has been described in terms of specified embodiments which are set forth in detail, it should be understood that this is by illustration only and that the invention is not necessarily limited thereto. Alternative embodiments and operating techniques will become apparent to those of ordinary skill in the art in view of the present disclosure. Accordingly, modifications of the invention are contemplated which may be made without departing from the spirit of the claimed invention.

The invention claimed is:

1. A hermaphroditic electric cable connector for a multiplicity of electric conduits, each conduit being electrically insulated from others in a cable consolidated assembly, said connector further having a substantially cylindrical configuration about an axis of revolution and comprising an outer annulus that is at least partially rotatable about a substantially cylindrical core and substantially fixed axially relative to said core; said electric conduits entering said core through a first axial end for connection to respective terminals secured within said core; a substantially circular cross-sectional area of a second axial end of said core being diametrically divided into two half-area sections; distal end-faces respective to each half-area section being profiled into at least two parallel chord sections whereby first distal end faces respective to one chord section of each half-area section are disposed substantially within the same cross-sectional plane; a second distal end face of a second chord section in a first half-area section disposed in a second cross-sectional plane; and a second distal end face of a second chord section in a second half-area disposed in a third cross-sectional plane, said second and third planes being axially displaced from said first plane in substantially equal and opposite directions; said terminals comprising a plurality of pins and sockets penetrating the distal end-faces of said chord sections and at least one pin among said plurality being electrically non-conductive.

2. An electric cable connector as described by claim 1 wherein a distal end of said outer annulus is configured for meshing with the distal end of an outer annulus corresponding to a second, substantially identical cable connector.

3. An electric cable connector as described by claim 2 wherein a plurality of socket positions are symmetrically distributed along the second distal end-face of said second plane and a plurality of pin positions are symmetrically distributed along the second distal end-face of said third plane.

4. An electric cable connector as described by claim 2 wherein a plurality of pin and socket positions are distributed over both of said first distal end-faces.

5. An electric cable connector as described by claim 1 wherein said second cross-sectional plane is more remote from said first axial end than said third cross-sectional plane.

6. An electric cable connector for substantially simultaneously connecting a consolidated plurality of electrically isolated terminals to a corresponding consolidated plurality of electrically isolated terminals, said connector having an outer collar that is at least partially rotatable about an inner core and substantially fixed relative to a length of said core, said core length having a cable receipt end and a connector interface end, a transverse profile of said interface end comprising first and second half-area sections, a first chord section of said first half-area section contiguously aligned with a second chord section of said second half-area section, a distal end-face of the first chord section disposed in a first transverse plane displaced from a second transverse plane respective to a distal end-face of said second chord section, a third chord section respective to each of said half-area sections having a distal end-face disposed in a third transverse plane substantially midway between and parallel with said first and second transverse planes; said terminals comprising a plurality of pins and sockets penetrating said distal end-faces with at least one potential electrical transmission oath blocked by a non-conductive pin.

7. A cable connector as described by claim 6 wherein said interface end is configured to mesh with the corresponding interface end of a substantially identical second cable connector.

8. A cable connector as described by claim 7 wherein end profiles of outer collars respective to each of said cable connectors are configured to rotatively mesh for securing a meshed engagement of respective interface ends.

9. A cable connector as described by claim 6 wherein conductive sockets are distributed along said first chord section and conductive pins are disposed along said second chord section.

10. A cable connector as described by claim 6 wherein conductive pins and sockets are selectively distributed over said third chord sections.

11. A cable connector as described by claim 6 wherein non-conductive pins are selectively distributed over said third chord sections.

12. A cable connector as described by claim 6 wherein said electrically isolated terminals comprise conductive and non-conductive pins selectively distributed over said third chord sections.

13. A data transmission cable assembly comprising a plurality of data conductors having distal ends terminating in a hermaphroditic connector, said connector having an outer collar that is at least partially rotatable about an inner core and substantially fixed relative to a length of said core, said core length having a data conductor receipt end and a connector interface end, a transverse profile of said interface end comprising first and second half-area sections, a first chord section of said first half-area section contiguously aligned with a second chord section of said second half-area section, a distal end-face of the first chord section disposed in a first transverse plane displaced from a second transverse plane respective to a distal end-face of said second chord section, a third chord section respective to each of said half-area sections having a distal end-face disposed in a third transverse plane substantially midway between and parallel with said first and second transverse planes, said data conductors terminating with a corresponding plurality of electrical sockets and pins wherein at least one of said pins is electrically non-conductive and positioned to mesh with a conductive socket in a corresponding hermaphroditic connector of another cable assembly.

14. A data transmission cable assembly as described by claim 13 wherein said connector interface end is configured to mesh with the corresponding interface end of a substantially identical second cable connector.

15. A data transmission cable assembly as described by claim 14 wherein an end profile of said outer collar is configured to rotatively mesh with an outer collar end profile of a substantially identical second connector.

16. A data transmission cable assembly as described by claim 13 wherein said conductor distal ends terminate with electrically isolated conductive pins and sockets that penetrate said core length.

17. A data transmission cable assembly as described by claim 16 wherein conductive sockets are distributed along said first chord section and conductive pins are disposed along said second chord section.

18. A data transmission cable assembly as described by claim 16 wherein conductive pins and sockets are selectively distributed over said third chord sections.

19. A data transmission cable assembly as described by claim 13 wherein said electrically isolated terminals comprise a plurality of non-conductive pins that are selectively distributed over said third chord sections.

20. A data transmission cable assembly as described by claim 13 wherein said electrically isolated terminals comprise a plurality of conductive and nonconductive pins selectively distributed over said third chord sections.

* * * * *